US012597663B2

(12) United States Patent
Heiser et al.

(10) Patent No.: US 12,597,663 B2
(45) Date of Patent: Apr. 7, 2026

(54) METHOD FOR PRODUCING A HIGH-VOLTAGE BATTERY UNIT AND A HIGH-VOLTAGE BATTERY UNIT

(71) Applicant: Bayerische Motoren Werke Aktiengesellschaft, Munich (DE)

(72) Inventors: Alexander Heiser, Munich (DE); Andreas Obermaier, Munich (DE); Philip Raettich, Bidingen (DE); Matthias Rambousek, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 614 days.

(21) Appl. No.: 17/311,550

(22) PCT Filed: Nov. 26, 2019

(86) PCT No.: PCT/EP2019/082614
§ 371 (c)(1),
(2) Date: Jun. 7, 2021

(87) PCT Pub. No.: WO2020/126354
PCT Pub. Date: Jun. 25, 2020

(65) Prior Publication Data
US 2022/0029236 A1    Jan. 27, 2022

(30) Foreign Application Priority Data
Dec. 20, 2018    (DE) .................... 10 2018 133 007.3

(51) Int. Cl.
*H01M 50/24* (2021.01)
*H01M 10/613* (2014.01)
(Continued)

(52) U.S. Cl.
CPC ......... *H01M 50/24* (2021.01); *H01M 10/613* (2015.04); *H01M 10/653* (2015.04);
(Continued)

(58) Field of Classification Search
CPC ............ H01M 10/613; H01M 10/653; H01M 10/655; H01M 50/204; H01M 50/24;
(Continued)

(56) References Cited

U.S. PATENT DOCUMENTS

| | | | | |
|---|---|---|---|---|
| 5,343,616 A | * | 9/1994 | Roberts ................ | H05K 9/0039 439/85 |
| 2004/0069230 A1 | * | 4/2004 | Fukuoka ............. | C23C 16/5096 118/723 E |

(Continued)

FOREIGN PATENT DOCUMENTS

| | | |
|---|---|---|
| CN | 105307848 A | 2/2016 |
| CN | 107852845 A | 3/2018 |

(Continued)

OTHER PUBLICATIONS

Mousavi et al, "Optimal design of an air-cooling system for a Li-Ion battery pack in Electric Vehicles with a genetic algorithm," 2011 IEEE Congress of Evolutionary Computation (CEC), New Orleans, LA, USA, 2011, pp. 1848-1855. (Year: 2011).*

(Continued)

*Primary Examiner* — A. Dexter Tugbang
(74) *Attorney, Agent, or Firm* — Crowell & Moring LLP

(57) ABSTRACT
A method for producing a high-voltage battery unit, particularly for vehicles, includes producing a housing, which has a plurality of housing walls coating interior sides of the
(Continued)

housing walls with a heat-resistant metal foil, introducing an electrical battery and cooling system into the housing, and sealing the housing.

11 Claims, 1 Drawing Sheet

(51) Int. Cl.

| | |
|---|---|
| *H01M 10/653* | (2014.01) |
| *H01M 10/655* | (2014.01) |
| *H01M 50/204* | (2021.01) |
| *H01M 50/224* | (2021.01) |
| *H01M 50/227* | (2021.01) |
| *H01M 50/231* | (2021.01) |

(52) U.S. Cl.
CPC ....... *H01M 10/655* (2015.04); *H01M 50/204* (2021.01); *H01M 50/224* (2021.01); *H01M 50/227* (2021.01); *H01M 50/231* (2021.01); *H01M 2220/20* (2013.01)

(58) Field of Classification Search
CPC ............. H01M 50/227; H01M 50/162; H01M 50/164; H01M 2220/10; Y02E 60/10; H05K 5/0091; H05K 5/0095; H05K 9/0039; H05K 9/0007; H05K 9/0084; C23C 16/5096
See application file for complete search history.

(56) References Cited

U.S. PATENT DOCUMENTS

| | | | | |
|---|---|---|---|---|
| 2014/0295239 | A1* | 10/2014 | Haug | H01M 50/613 |
| | | | | 29/623.2 |
| 2014/0363716 | A1* | 12/2014 | Nishida | Y02E 60/10 |
| | | | | 429/96 |
| 2015/0125719 | A1* | 5/2015 | Hongo | H01M 10/613 |
| | | | | 429/50 |
| 2016/0044840 | A1* | 2/2016 | Wagner | H01M 50/24 |
| | | | | 174/384 |
| 2018/0249601 | A1 | 8/2018 | Raettich et al. | |

FOREIGN PATENT DOCUMENTS

| | | | |
|---|---|---|---|
| CN | 207587767 U | | 7/2018 |
| DE | 10 2011 052 515 A1 | | 2/2013 |
| DE | 10 2014 005 980 A1 | | 11/2014 |
| DE | 10 2013 213 233 A1 | | 1/2015 |
| DE | 10 2015 220 473 A1 | | 4/2017 |
| JP | 8-250152 A | | 9/1996 |
| JP | 8-315854 A | | 11/1996 |
| JP | 2003-007256 A | | 1/2003 |
| JP | 2009-259748 A | | 11/2009 |
| JP | 2013097968 A | * | 5/2013 |
| WO | WO 2013/020700 A1 | | 2/2013 |

OTHER PUBLICATIONS

Chinese-language Office Action issued in Chinese Application No. 201980064306.4 dated Aug. 16, 2022 with English translation (15 pages).

International Search Report (PCT/ISA/210) issued in PCT Application No. PCT/EP2019/082614 dated Mar. 5, 2020 with English translation (four (4) pages).

German-language Written Opinion (PCT/ISA/237) issued in PCT Application No. PCT/EP2019/082614 dated Mar. 5, 2020 (five (5) pages).

German-language Search Report issued in German Application No. 10 2018 133 007.3 dated Aug. 29, 2019 with partial English translation (14 pages).

* cited by examiner

METHOD FOR PRODUCING A HIGH-VOLTAGE BATTERY UNIT AND A HIGH-VOLTAGE BATTERY UNIT

BACKGROUND AND SUMMARY OF THE INVENTION

The present invention relates to a method for producing a high-voltage battery unit, in particular for vehicles.

High-voltage battery units for electric vehicles or hybrid vehicles often have a high-voltage battery housing made of light metal or plastics material. For example, the high-voltage battery housing of the BMW I3 consists of aluminum. Important parameters when designing high-voltage battery housings are the weight, the production costs and the producibility as well as safety, in particular in extreme situations, such as serious accidents, for example.

The object of the invention is to specify a method for producing a high-voltage battery unit as well as a corresponding high-voltage battery unit which has the highest possible level of operational safety and indeed even in extreme situations, such as serious accidents, for example.

This object is achieved by the claimed invention.

The starting point of exemplary embodiments of the invention is a method for producing a high-voltage battery unit, in particular for vehicles, wherein a housing is firstly produced which has a plurality of housing walls. The term "housing walls" is to be interpreted in an extremely broad sense. It refers to all walls (e.g. side walls, bases, covers, or the like) which delimit the housing of the high-voltage battery unit.

After producing the high-voltage battery housing, an electrical storage and cooling system is introduced into the housing. The precise structure of a storage system of this type does not need to be explained in greater detail here. It can be formed from a plurality of or numerous storage cells which can be combined to make individual prefabricated storage modules which are connected to one another. The cooling system is a cooling system by which the effective heat can be discharged from the storage cells or with which the storage cells can be heated in the case of low temperatures.

The housing is subsequently sealed.

The essence of exemplary embodiments of the invention involves interior sides of the housing walls of the high-voltage battery housing being coated with a heat-resistant metal foil. Coating the interior sides of the housing walls with the heat-resistant metal foil preferably takes place before introducing the electrical storage and cooling system. If cell internal short circuits occur in the high-voltage battery unit as a result of an extremely serious accident, for example, hot gases may emerge from individual or a plurality of storage cells. The heat resistance of the high-voltage battery housing can be significantly increased by coating the housing walls of the high-voltage battery housing with a heat-resistant metal foil. A metal foil of this type barely requires any installation space. With regard to their thermal resistance, existing and tested battery housings can therefore be designed to be even more heat resistant in a simple and very cost effective manner by way of coating with a heat-resistant metal foil, without having to substantially change the basic concept or the geometry of the housing. The lightweight character of an existing high-voltage battery housing can also be retained, since the metal foil additionally used is very thin in comparison to the housing wall thickness. In addition, a metal foil of this type is significantly cheaper than other heat protection materials, such as fire protection paints and the like, for example.

The metal foil is preferably connected to the housing in an electrically conductive manner.

Furthermore, the metal foil can be galvanized or painted. Alternatively, a metal foil which is coated or covered with an insulating layer can also be used.

According to one development of the invention, the interior sides of the housing walls are completely coated with a heat-resistant metal foil. In particular, the entire high-voltage battery housing can be coated from the inside with a metal foil of this type. A steel foil can be used as a metal foil, for example. Steel foils are very heat resistant and also very cost effective.

A light metal material, in particular an aluminous material or aluminum or a plastics material can be used as a material for the housing walls.

According to one development of the invention, before coating the housing walls, the metal foil is shaped to correspond to the interior shape of the housing. Shaping can take place by thermoforming, embossing, and/or folding or by another shaping method, for example.

The metal foil which is used for coating can be composed of a plurality of pieces of foil. Provision can be made for the neighboring pieces of foil to overlap one another at the "composition points" or "contact points". At these points, the individual pieces of foil can be connected to one another, for example by adhesive bonding, soldering, screwing, embossing, folding, welding or by other connection technology.

Furthermore, provision can be made for the metal foil to be fixed to the housing walls from the inside. This can take place by adhesive bonding, screwing, extrusion, and/or other fixing methods, for example.

Furthermore, provision can be made for at least one component to be introduced into the housing, which component can be displaced at least to a predetermined extent with respect to the housing walls during operation of the high-voltage battery unit and for a flexible "contact element" to be introduced between this component and the metal foil, which prevents the metal foil from slipping when the component is displaced. The "component" can be a component of the cooling system, for example. Different temperature levels or different operating conditions may result in individual cooling system components thermally expanding and thus being displaced slightly on the high-voltage battery housing. In this case, it is advantageous if a flexible contact element (see above explanations) is introduced between components of this type and the metal foil. As a result, the "displacing component" is mechanically decoupled from the metal foil, whereby an unintentional slipping of the metal foil when the component is displaced or when the component expands is prevented.

In one development of the invention, provision can be made for the electrical storage and cooling system to have a plurality of electrical storage cells or a plurality of storage modules which are each formed by a plurality of electrical storage cells, and cooling elements which have a coolant or cooling agent flowing through them and which are or will be thermally connected to the storage cells.

For the sake of completeness, it should be mentioned that the subject matter of exemplary embodiments of the invention is not only a method for producing a high-voltage battery unit, but also a high-voltage battery unit which is produced according to this method or a vehicle which contains a high-voltage battery unit which is produced according to this method.

The invention is explained in greater detail hereinafter in relation to the drawings.

DETAILED DESCRIPTION OF THE DRAWINGS

Figures 1A, 1B, 1C, 1D:
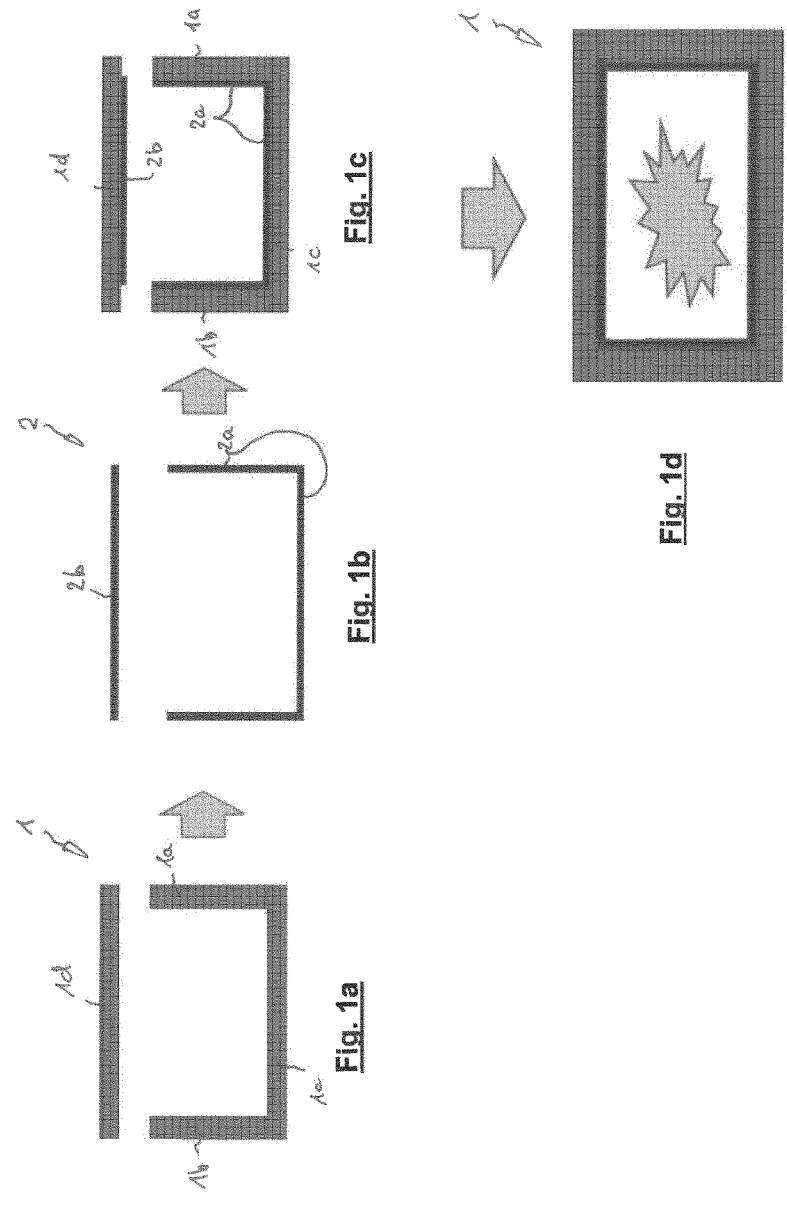
FIGS. 1*a*-1*d* show the individual steps for producing a high-voltage battery housing according to embodiments of the invention.

As can be seen from FIG. 1*a*, a high-voltage battery housing 1 is firstly produced, which has a plurality of housing walls, such as, for example, lateral housing walls 1*a*, 1*b*, a housing base 1*c* and a housing cover 1*d*.

A heat-resistant metal foil 2 is subsequently produced which can be composed of a plurality of pieces of foil 2*a*, 2*b*. This is represented in FIG. 1*b*. Interior sides of the housing walls 1*a*-1*d* are subsequently coated with the metal foil 2*a*, 2*b* which is composed of a plurality of pieces of metal foil. As can be seen from FIG. 1*c*, the piece of foil 2*b* is applied to the interior side or underside of the housing cover 1*d*. The piece of foil 2*a* is applied to the interior side of the lateral housing walls 1*a*, 1*b* and of the housing base 1*c*. After coating the high-voltage battery housing 1 with the heat-resistant metal foil 2, electrical storage and cooling system components (not represented) are introduced into the high-voltage battery housing 1 and, as represented in FIG. 1*d*, the high-voltage battery housing 1 is subsequently sealed.

What is claimed is:

1. A method for producing a high-voltage battery unit, the method comprising:

providing a housing having a plurality of housing walls;

covering interior sides of the housing walls with a heat-resistant metal foil;

introducing an electrical storage system and a cooling system into the housing, wherein the cooling system comprises at least one component that is displaceable at least to a predetermined extent with respect to the housing walls during operation of the high-voltage battery unit;

introducing a flexible contact element between the at least one component and the heat-resistant metal foil; and sealing the housing, wherein, before covering the interior sides of the housing walls, the heat-resistant metal foil is shaped by at least one of thermoforming, embossing, or folding of the heat-resistant metal foil, such that a shape of the heat-resistant metal foil corresponds to an interior shape of the housing, and wherein the flexible contact element prevents the heat-resistant metal foil from slipping when the at least one component is displaced.

2. The method according to claim 1, wherein the interior sides of the housing walls are completely covered with the heat-resistant metal foil.

3. The method according to claim 1, wherein the heat-resistant metal foil comprises a foil made of steel.

4. The method according to claim 1, wherein the housing walls comprise a light metal material.

5. The method according to claim 4, wherein the light metal material comprises at least one of an aluminous material or aluminum or a plastics material.

6. The method according to claim 1, wherein the heat-resistant metal foil comprises a plurality of pieces of foil, and neighboring pieces of the plurality of pieces of foil are at least one of connected to one another or overlap one another.

7. The method according to claim 1, wherein the heat-resistant metal foil is fixed to the housing walls.

8. The method according to claim 7, wherein the heat-resistant metal foil is fixed to the housing walls by at least one of adhesive bonding, screwing, or extrusion.

9. The method according to claim 1, wherein:

the electrical storage system comprises a plurality of electrical storage cells or a plurality of storage modules which are formed from electrical storage cells, and the cooling system comprises cooling elements which have a coolant or cooling agent flowing through them and which are or will be thermally connected to the storage cells.

10. The method according to claim 1, wherein the heat-resistant metal foil is connected to the housing in an electrically conductive manner.

11. A high-voltage battery unit that has been produced by the method according to claim 1.

* * * * *